(12) United States Patent
Yoshimi et al.

(10) Patent No.: US 6,771,340 B1
(45) Date of Patent: Aug. 3, 2004

(54) COMPOSITE RETARDER PLATE HAVING RETARDER FILM WITH AT LEAST ONE REFRACTIVE INDEX DIFFERENT FROM THE OTHER INDICES AND A LIQUID CRYSTAL POLYMER PHASE SHEET HAVING A TRANSPARENT LAYER WITH ALL REFRACTIVE INDICES DIFFERENT FROM ONE ANOTHER

(75) Inventors: Hiroyuki Yoshimi, Osaka (JP); Akira Ohtani, Osaka (JP); Takashi Yamaoka, Osaka (JP); Yuichi Nishikoji, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/633,338

(22) Filed: Aug. 4, 2000

(30) Foreign Application Priority Data

Aug. 4, 1999 (JP) .................................... P. 11-221395

(51) Int. Cl.$^7$ ............................................. G02F 1/1335
(52) U.S. Cl. ........................................ 349/118; 349/119
(58) Field of Search ............................... 349/113, 117, 349/115, 112, 162, 99, 98, 118

(56) References Cited

U.S. PATENT DOCUMENTS

| 5,124,824 A | * | 6/1992 | Kozaki et al. ................. 359/73 |
| 5,528,400 A | * | 6/1996 | Arakawa ...................... 349/117 |
| 5,543,948 A | * | 8/1996 | Takahashi et al. ............. 359/73 |
| 5,612,801 A | * | 3/1997 | Winker ......................... 349/119 |
| 5,784,139 A | * | 7/1998 | Chigrinov et al. ............. 349/117 |
| 6,208,396 B1 | * | 3/2001 | Shimizu et al. ................ 349/119 |
| 6,219,121 B1 | * | 4/2001 | Sahouani et al. ............... 349/117 |

FOREIGN PATENT DOCUMENTS

JP 7-306406 11/1995 ......... G02F/1/1335

* cited by examiner

Primary Examiner—Kenneth Parker
(74) Attorney, Agent, or Firm—Sughrue Mion, PLLC

(57) ABSTRACT

A composite retarder plate is constituted by a combination of at least one retarder film and at least one liquid-crystal phase sheet. The liquid-crystal phase sheet includes a transparent substrate, and a liquid-crystal polymer layer provided on the transparent substrate. At least one of refractive indices nx, ny and nz of the retarder film is different from the other refractive indices when nx and ny are main refractive indices (nx≧ny) in in-plane directions and nz is a refractive index in a direction of the thickness of the composite retarder plate, respectively. All the refractive indices nx, ny and nz of the transparent substrate are different from one another. The retarder film, the transparent substrate and the liquid-crystal polymer layer are different in wavelength dependence of birefringence. The retarder film and the transparent substrate are different in Nz defined by the expression (nx−nz)/(nx−ny). Each of the retarder film and the transparent substrate is constituted by a film having non-liquid-crystal high molecules oriented. An optically compensatory polarizing plate, and a liquid-crystal display device is provided by disposing the aforementioned composite retarder plate on an absorption type polarizing plate.

6 Claims, 1 Drawing Sheet

COMPOSITE RETARDER PLATE HAVING RETARDER FILM WITH AT LEAST ONE REFRACTIVE INDEX DIFFERENT FROM THE OTHER INDICES AND A LIQUID CRYSTAL POLYMER PHASE SHEET HAVING A TRANSPARENT LAYER WITH ALL REFRACTIVE INDICES DIFFERENT FROM ONE ANOTHER

BACKGROUND OF THE INVENTION

1. Field of the Invention

The present invention relates to a composite retarder plate and an optically compensatory polarizing plate which can compensate highly for birefringence due to liquid crystal so that a liquid-crystal display device excellent in view field angle and contrast can be formed.

The present application is based on Japanese Patent Application No. Hei. 11-221395, which is incorporated herein by reference.

2. Description of the Related Art

Enlargement of the view field angle and increase of contrast have been required with the diffusion of liquid-crystal display devices (LCD) to television sets, personal computer monitors, etc. In the meanwhile, there was a proposal of making a retarder plate compensate for a phase difference due to birefringence of liquid crystal to improve visibility characteristic, for example, to achieve enlargement of the view field angle of good visibility in a TN-LCD and to achieve monochrome display owing to coloring compensation in an STN-LCD. The background-art compensatory plate was, however, insufficient to cope with the phase difference characteristic of liquid crystal. There was a problem that the improvement of the visibility characteristic of liquid crystal by the background-art compensatory plate was not satisfactory.

Incidentally, in the TN-LCD, a Wide View film (tradename, made by Fuji Photo Film Co., Ltd.) and an NH film (tradename, made by Nippon Oil Co., Ltd.) are known as compensatory plates for enlarging the view field angle. There was, however, a problem in tone reversal, remarkable lowering of contrast at a view field angle of 60 degrees or higher, coloring in a monochrome level, and so on.

On the other hand, in the STN-LCD, a superposition type compensatory plate made of a laminate of retarder plates of polymers exhibiting positive birefringence characteristic is known (Unexamined Japanese Patent Publication No. Hei. 7-306406). There was, however, a problem that coloring compensation was so insufficient that coloring occurred in monochrome display. Moreover, in a TFT-LCD, enlargement of the view field angle is required even in a vertical arrangement (VA) mode, a horizontal arrangement mode, etc. as well as a TN mode. The aforementioned compensatory plate was, however, hard to be adapted to the enlargement of the view field angle.

SUMMARY OF THE INVENTION

An object of the present invention is to develop a retarder plate which can compensate highly for a phase difference due to birefringence of liquid crystal so that a liquid-crystal display device excellent in view field angle, in contrast and in uniformity thereof can be formed.

According to the present invention, there is provided a composite retarder plate comprising a combination of at least one retarder film and at least one liquid-crystal phase sheet, the liquid-crystal phase sheet including a transparent substrate, and a liquid-crystal polymer layer provided on the transparent substrate, wherein: at least one of refractive indices nx, ny and nz of the retarder film is different from the other refractive indices when nx, ny and nz are main refractive indices ($nx \geq ny$) in in-plane directions and a refractive index in a direction of the thickness of the composite retarder plate, respectively; all the refractive indices nx, ny and nz of the transparent substrate are different from one another; the retarder film, the transparent substrate and the liquid-crystal polymer layer are different in wavelength dependence of birefringence; the retarder film and the transparent substrate are different in Nz defined by the expression (nx−nz)/(nx−ny); and each of the retarder film and the transparent substrate is constituted by a film having non-liquid-crystal high molecules oriented.

According to the present invention, there is provided an optically compensatory polarizing plate, wherein the aforementioned composite retarder plate is provided on a single side of an absorption type polarizing plate. There is further provided a liquid-crystal display device, wherein the aforementioned optically compensatory polarizing plate is disposed on at least one side of the liquid-crystal cell.

According to the present invention, a composite of phase difference layers is made on the basis of combination of a retarder film, a transparent substrate and a liquid-crystal polymer layer different in wavelength dependence (wavelength dispersion) of birefringence and on the basis of combination of the retarder film and the transparent substrate different in part or all of the refractive indices in in-plane and thickness directions and different in Nz. Hence, wavelength dependence is controlled by the synthesis of the phase difference layers so that a retarder plate capable of compensating highly for a phase difference due to birefringence of liquid crystal can be obtained. Particularly, a liquid-crystal display device which can compensate highly for coloring due to the view field angle and which is excellent in view field angle, contrast and uniformity thereof can be formed.

That is, birefringence of liquid crystal varies in accordance with the state of orientation even in the case of one and the same liquid crystal. For the purpose of compensating for such birefringence and particularly for the purpose of compensating for coloring owing to the view field angle, it is necessary to cope with wavelength dependence on a phase difference and coloring as well as to cope with the phase difference and the change of the viewing angle. A retarder plate having enriched phase difference characteristic can be obtained by combination of materials different in wavelength dispersion and particularly by combination of materials different in Nz with respect to wavelength dispersion of $\Delta nxy$ and $\Delta nxz$ which are defined by (nx−ny) and (nx−nz) respectively and which have large influence on the change of the viewing angle. Hence, it is possible to cope highly with the phase difference due to birefringence of liquid crystal, the change due to the viewing angle and the wavelength dependence of these characteristics. Hence, accuracy in compensation for coloring due to the view field angle can be improved greatly. Accordingly, it is supposed that shortage of compensation by the background-art compensatory plate is based on the fact that the background-art compensatory plate cannot be adapted sufficiently to wavelength dependence of the phase difference and the change of the viewing angle.

Features and advantages of the invention will be evident from the following detailed description of the preferred embodiments described in conjunction with the attached drawings.

DETAILED DESCRIPTION OF THE PREFERRED EMBODIMENTS

Figure 1:
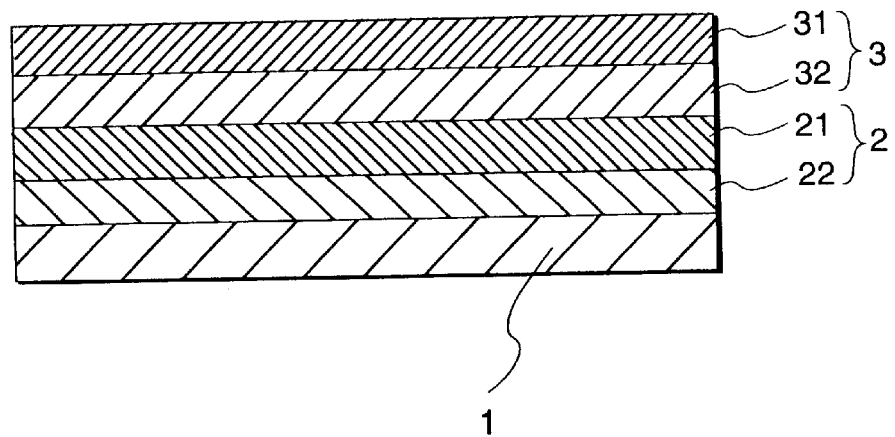
FIG. 1 is a sectional view showing an example of an optically compensatory polarizing plate.

A composite retarder plate according to the present invention comprises a combination of at least one retarder film and at least one liquid-crystal phase sheet. The liquid-crystal phase sheet includes a transparent substrate, and a liquid-crystal polymer layer provided on the transparent substrate. At least one of refractive indices nx, ny and nz of the retarder film is different from the other refractive indices when nx and ny are main refractive-indices (nx≧ny) in in-plane directions and nz is a refractive index in a direction of the thickness of the composite retarder plate, respectively. All the refractive indices nx, ny and nz of the transparent substrate are different from one another. The retarder film, the transparent substrate and the liquid-crystal polymer layer are different in wavelength dependence of birefringence. The retarder film and the transparent substrate are different in Nz defined by the expression (nx−nz)/(nx−ny). Each of the retarder film and the transparent substrate is constituted by a film having non-liquid-crystal high molecules oriented. FIG. 1 shows an example of the composite retarder plate. In FIG. 1, the reference numeral 1 designates a retarder film; 2, a liquid-crystal phase sheet; 21, a transparent substrate; and 22, a liquid-crystal polymer layer. In the illustrated example shown in FIG. 1, the composite retarder plate is further combined with an absorption type polarizing plate 3 to thereby form an optically compensatory polarizing plate.

A film of suitable non-liquid-crystal high molecules oriented and exhibiting the aforementioned refractive index characteristic can be used as each of the retarder film and the transparent substrate without any special limitation. Incidentally, examples of such a film include various films of non-liquid-crystal polymers stretched by a suitable method such as one-way drawing, two-way drawing, or the like. Especially, films excellent in light permeability and short in irregularity of orientation and irregularity of a phase difference may be preferably used.

Examples of the non-liquid-crystal polymer are polycarbonates, polyallylates, polyesters such as polyethylene terephthalate and polyethylene naphthalate, polysulfones, olefin polymers, norbornene polymers, acrylic polymers, styrene polymers, cellulose polymers such as triacetyl cellulose, polyvinyl alcohols, and mixture polymers made of two or three kinds of polymers selected from the aforementioned polymers.

Use of the non-liquid-crystal polymer can also facilitate controlling over the photoelastic coefficient to thereby suppress the change of birefringence characteristic (phase difference characteristic) due to stress caused by the temperature change, humidity, light, adhering, etc. It is preferable from this point of view that each of the retarder film and the transparent substrate is made of a high-molecular film having a photoelastic coefficient of $50 \times 10^{-12}$ $m^2/N$ or less, especially $30 \times 10^{-12}$ $m^2/N$ or less, more especially $20 \times 10^{-12}$ $m^2/N$ or less in terms of the absolute value thereof.

In the case where the transparent substrate is further provided to form a liquid-crystal phase sheet disposed as a transparent protective layer for protecting a polarizing film in the optically compensatory polarizing plate, it is preferable from this point of view that the transparent substrate is made of a high-molecular film having a photoelastic coefficient of $15 \times 10^{-12}$ $m^2/N$ or less, especially $10 \times 10^{-12}$ $m^2/N$ or less in terms of the absolute value thereof.

When nx and ny (nx≧ny) are main refractive indices in in-plane directions and nz is a reflective index in a direction of the thickness of the composite retarder plate respectively (the same rule applies hereinafter), at least one of the refractive indices nx, ny and nz of the retarder film to be used for formation of the composite retarder plate is different from the others. Hence, the refractive index characteristic of the retarder plate can be expressed as any one of nx=ny>nz, nx>ny>nz, nx>ny=nz, nx>nz>ny, nx=nz>ny, nz>nx>ny and nz>nx=ny.

On the other hand, all the refractive indices of the transparent substrate to be used for formation of the composite retarder plate are different from one another. Hence, the refractive index characteristic of the transparent substrate can be expressed as any one of nx>ny>nz, nx>nz>ny and nz>nx>ny. Although a liquid-crystal polymer layer is provided on the transparent substrate to thereby form a liquid-crystal phase sheet in the present invention, the liquid-crystal polymer layer supported by the transparent substrate is not particularly limited. A suitable layer, exhibiting orientation characteristic in accordance with the orientation mode, or the like, in a liquid-crystal cell as a subject of compensation may be used as the liquid-crystal polymer layer.

Incidentally, examples of the liquid-crystal polymer layer may include oriented layers of discotic liquid-crystal polymers, nematic liquid-crystal polymers, cholesteric liquid-crystal polymers, smectic liquid-crystal polymers, and so on, as in the aforementioned Wide View and NH films. Especially, oriented layers short in irregularity of orientation are preferred. On the other hand, a sheet having crystal orientation exhibiting asymmetry with respect to a plane including a normal line in view field angle characteristic of birefringence may be preferably used as the liquid-crystal phase sheet from the point of view of compensation accuracy, or the like.

For example, the composite phase plate can be formed by a method of laminating at least one retarder film and at least one liquid-crystal phase sheet. In this case, according to the present invention, the retarder film, the transparent substrate and the liquid-crystal polymer layer are used in combination so that the retarder film, the transparent substrate and the liquid-crystal polymer layer are different in wavelength dependence of birefringence and, at the same time, the retarder film and the transparent substrate are different in Nz defined by the expression: (nx−nz)/(nx−ny).

In the above description, the combination of the retarder film, the transparent substrate and the liquid-crystal polymer layer different in wavelength dependence of birefringence can be selected optionally and the combination of the retarder film and the transparent substrate different in Nz (an index of view field angle characteristic) can be also selected optionally. Because members different in wavelength dependence of birefringence are used in combination, the resulting plate can be obtained as a composite retarder plate exhibiting special wavelength dependence different from that in each of the used members such as the retarder film, etc.

Because members different in Nz are also used in combination, the resulting plate can be obtained as a composite retarder plate exhibiting special Nz characteristic different from that in each of the used members. Because the aforementioned wavelength dependence is also exhibited with respect to Nz, the resulting plate can be obtained as a composite retarder plate generally exhibiting phase difference characteristic that cannot be obtained by a single product of each of the members. Hence, the resulting plate can be obtained as a composite retarder plate which can cope with and compensate for a difference in birefringence characteristic in accordance with the state of orientation of liquid crystal.

When the combination of the retarder film, the transparent substrate and the liquid-crystal polymer layer and the number of combinations thereof are changed, the wavelength dependence and phase difference characteristic such as Nz in the composite retarder plate can be controlled. In this case, angles of arrangement of nx axes, etc. in between the retarder film and the transparent substrate and in between the liquid-crystal polymer layer and these members are optional. The phase difference characteristic can be adjusted also by controlling the angles of arrangement so that, for example, (pseudo) optical rotatory power can be given when these delayed phase axes (nx axes) are arranged to cross one another. Incidentally, the wavelength dependence is exhibited with respect to (pseudo) optical rotatory power due to the cross arrangement of the nx axes.

When members having the same wavelength dependence are combined, the wavelength dependence in the composite retarder plate obtained is so equal to the wavelength dependence in each of the members. Hence, the composite retarder plate does not exhibit different wavelength dependence. In this case, wavelength dependence with respect to Nz is not generated, so that the Nz value is kept as constant as that in each of the members irrespective of wavelength. Hence, when two or more retarder films or liquid-crystal phase sheets are used, it is preferable from the point of view of conversion of phase difference characteristic that the films or sheets are used in combination so as to be different in wavelength dependence of birefringence and Nz.

The aforementioned composite based on combination of members different in wavelength dependency and Nz can give novel phase difference characteristic. Hence, the composite retarder plate can be obtained as a plate exhibiting various kinds of phase difference characteristics and enriched sufficiently to compensate for a phase difference due to birefringence of liquid crystal, the change thereof due to the viewing angle, the wavelength dependence of these characteristics, and so on. Hence, the composite retarder plate can also compensate highly for a difference in birefringence characteristic due to a difference in the state of orientation of liquid crystal, or the like.

Incidentally, the refractive index characteristic in each of the retarder film and the transparent substrate can be controlled by the kind of the polymer, the stretching condition, the orienting condition, and so on. The refractive index nz in the direction of the thickness can be controlled by a method such as a method in which a high-molecular film to be treated is drawn or shrunk under action of shrinking force of a heat-shrinkable film by heating in the condition that the heat-shrinkable film constituted by one layer or by two or more layers is bonded to a single surface or each surface of the high-molecular film. The high-molecular film to be treated may be prepared by a suitable method such as a casting method or an extrusion molding method according to the background art.

Incidentally, the thickness of each of the retarder film and the transparent substrate can be determined suitably in accordance with the target phase difference characteristic, or the like. Although the thickness generally used is a range of from 1 to 500 $\mu$m, especially in a range of from 3 to 350 $\mu$m, more especially in a range of 5 to 250 $\mu$m, the thickness is not limited thereto. On the other hand, the thickness of the liquid-crystal polymer layer is generally not larger than 100 $\mu$m, especially not larger than 20 $\mu$m, more especially in a range of from 0.1 to 10 $\mu$m. The thickness of the liquid-crystal polymer layer is not limited thereto.

The composite retarder plate according to the present invention may be put into practical use without any modification or may be provided on a single side of an absorption type polarizing plate 3 so as to be modified as an optically compensatory polarizing plate as shown in FIG. 1. A suitable absorption type polarizing plate can be used for the formation of the optically compensatory polarizing plate if the absorption type polarizing plate can exhibit characteristic of transmitting light linearly polarized on a predetermined vibration plane but absorbing the other light. The absorption type polarizing plate is not-particularly limited in kind.

Examples of the generally used absorption type polarizing plate are polarizing films each obtained by making a film of hydrophilic high-molecules such as polyvinyl alcohol, partially formalized polyvinyl alcohol and partially saponified ethylene-vinyl acetate copolymer adsorb iodine and/or a dichromatic material such as a dichromatic dye and by drawing and orienting the film.

The absorption type polarizing plate may be formed so that a transparent protective layer 21/31 is provided on a single surface or each surface of the polarizing film 32 as shown in FIG. 1. The transparent protective layer is provided for various purposes of reinforcement of the polarizing film, improvement of heat resistance and moisture resistance, and so on. The transparent protective layer can be formed as a resin-coating layer or as a laminate layer of resin films. The transparent protective layer may contain fine particles for diffusion, surface roughness, and so on.

The transparent protective layer may be also provided as a transparent substrate made of a drawn film of the aforementioned cellulose polymer. This case is effective for reduction in thickness of the optically compensatory polarizing plate because the liquid-crystal phase sheet 2 for forming the composite retarder plate according to the present invention serves also as the transparent protective layer 21 for protecting the polarizing film 32 in the absorption type polarizing plate 3 as shown in FIG. 1. This case is further useful for improvement in assembling efficiency of the liquid-crystal display device and improvement in accuracy of compensation for birefringence due to liquid crystal.

The absorption type polarizing plate may be further provided with an anti-reflection layer or with an anti-glare layer for the purpose of prevention of surface reflection, or the like. The anti-reflection layer can be formed suitably as a coating layer of a fluorine polymer, a light interference film such as a multilayer metal vapor deposition film, or the like. On the other hand, the anti-glare layer may be also formed, for example, as a resin coating layer containing fine particles or by a suitable method of scattering surface-reflected light by giving a fine roughness structure to its surface by a suitable method such as embossing, sandblasting, etching, etc.

Examples of the fine particles are inorganic fine particles of silica, calcium oxide, alumina, titania, zirconia, tin oxide, indium oxide, cadmium oxide, antimony oxide, etc., which have a mean particle diameter in a range of from 0.5 to 20 $\mu$m and may be electrically conductive, and crosslinked or non-crosslinked organic fine particles of suitable polymers such as polymethyl methacrylate and polyurethane. Suitable one kind or suitable two or more kinds selected from these fine-particle materials may be used.

The respective layers such as the retarder film, the liquid-crystal phase sheet, the absorption type polarizing plate, etc. for forming the composite retarder plate or the optically compensatory polarizing plate according to the present invention may be separated from one another. From the point of view of suppression of reflection on the basis of the adjustment of interlayer refractive index difference, prevention of displacement of an optical system, prevention of entrance of foreign matter such as dust, and so on, it is preferable that the respective layers are partially fixed, especially entirely fixed to one another.

A suitable material such as a transparent adhesive agent can be used for the aforementioned fixing process. The kind of the adhesive agent, or the like, is not particularly limited. From the point of view of prevention the optical characteristic of the constituent members from changing, a material not requiring a high-temperature process for curing and drying in the adhering process is preferred and a material not requiring any long curing time and any long drying time is preferred. From this point of view, an adhesive layer may be preferably used.

A transparent adhesive agent made from a suitable polymer such as acrylic polymer, silicone polymer, polyester, polyurethane, polyether, synthetic rubber, or the like, can be used for the formation of the adhesive layer. Especially, an acrylic adhesive agent is preferred from the point of view of optical transparency, adhesive characteristic, weather resistance, etc.

Incidentally, the adhesive layer may be provided on a single surface or each surface of the composite retarder plate, the optically compensatory polarizing plate, or the like, for the purpose of adhering to a subject of adherence such as the liquid-crystal cell, or the like, as occasion demands. In the case where the adhesive layer is exposed to the surface, a separator, or the like, may be preferably temporarily bonded to the adhesive layer to prevent the surface of the adhesive layer from contamination, or the like, until the adhesive layer is put into practical use.

Incidentally, the relation in arrangement between the advanced phase axis of the composite retarder plate and the transmission axis of the polarizing plate in the optically compensatory polarizing plate is not particularly limited and can be determined suitably. Generally, when the nx axis of the composite retarder plate and the transmission axis of the polarizing plate are arranged to be parallel or perpendicular to each other, characteristic in an oblique direction in which the viewing angle changes can be controlled without any influence on characteristic in a frontal (vertical) direction to thereby achieve enlargement of the view field angle. Hence, in the case where the present invention is applied to an STN-LCD, the advanced phase axis of the composite retarder plate and the transmission axis of the polarizing plate are often arranged so as to cross each other. In the case where the present invention is applied to a TN-LCD, the advanced phase axis of the composite retarder plate and the transmission axis of the polarizing plate are often arranged so as to be parallel or perpendicular to each other.

The composite retarder plate or the optically compensatory polarizing plate according to the present invention can be used preferably as a plate compensating for birefringence of liquid crystal when a liquid-crystal display device is formed. The liquid-crystal display device is generally formed by assembling a polarizing plate, a liquid-crystal cell and a compensatory plate with other constituent parts such as a back-lighting unit, a reflection plate, etc., suitably as occasion demands and by installing a drive circuit, or the like, into the assembly. In the present invention, there is no particular limitation except that the aforementioned composite retarder plate or optically compensatory polarizing plate is used. Hence, in the present invention, the liquid-crystal display device can be formed in the same manner as in the background art.

Hence, suitable optical devices, that is, for example, a light-scattering plate, an anti-glare layer and a prism sheet provided on the visual side polarizing plate, an anti-reflection film, a protective film and a protective plate, and an optical path control plate such as a prism sheet provided on the back-lighting unit, can be arranged suitably when the liquid-crystal display device is formed. Incidentally, such a compensatory plate or such compensatory plates are generally arranged between the liquid-crystal cell and the visual side polarizing plate or/and between the liquid-crystal cell and the back-lighting side polarizing plate. Hence, the composite retarder plate or optically compensatory polarizing plate according to the present invention may be arranged on at least one side of the liquid-crystal cell.

EXAMPLE 1

A polyvinyl alcohol film 75 $\mu$m thick was dyed in an aqueous solution containing iodine. Then, the film was one-way drawn six times between rolls different in circumferential seed in an aqueous solution containing boric acid to thereby obtain a polarizing film. A triacetyl cellulose film 80 $\mu$m was bonded onto a single surface of the polarizing film by a polyvinyl alcohol adhesive agent. A liquid-crystal phase sheet was bonded onto the other surface of the polarizing film by a polyvinyl alcohol adhesive agent. A retarder film was further bonded onto the liquid-crystal phase sheet through an acrylic adhesive layer. Thus, an optically compensatory polarizing film was obtained.

Incidentally, the liquid-crystal phase sheet was prepared as follows. A triacetyl cellulose film 100 $\mu$m thick was drawn at 200° C. by a tenter drawing machine to thereby form transparent substrate having refractive index characteristic of nx>ny>nz and having $\Delta$nxy·d of 10 nm, $\Delta$nxz·d of 60 nm and Nz of 6. Then, only a liquid-crystal polymer layer of a Wide View film (WV02A) was transferred onto the transparent substrate. Thus, the liquid-crystal phase sheet was prepared. The liquid-crystal phase sheet was bonded to the polarizing film through the transparent substrate side. Incidentally, d was the film thickness. In the transferring process, after the Wide View film was moistened, only the liquid-crystal polymer layer was transferred and bonded onto the transparent substrate through an adhesive agent. In that case, the transferring process was carried out so that the nx direction of the transparent substrate and the discotic tilt axis of the liquid-crystal polymer layer became parallel with each other.

On the other hand, the retarder film was prepared as follows. A norbornene resin film (Arton, made by JSR Corp.) 100 $\mu$m thick was drawn at 175° C. by a tenter drawing machine. Thus, the resulting film was prepared as the retarder film having refractive index characteristic of nx>ny>nz and having $\Delta$nxy·d of 40 nm, $\Delta$nxz·d of 50 nm and Nz of 1.25.

EXAMPLE 2

An optically compensatory polarizing plate was obtained in the same manner as in Example 1 except that a Wide View film was used as the liquid-crystal phase sheet in Example 2. Incidentally, the Wide View film was prepared as follows. A transparent substrate made of a triacetyl cellulose film 100

μm thick, having refractive index characteristic of nx>ny>nz and having Δnxy·d of 5 nm, Δnxz·d of 60 nm and Nz of 12 was coated with a discotic liquid-crystal polymer layer. Thus, the Wide View film was prepared.

COMPARATIVE EXAMPLE

An (optically compensatory) polarizing plate was obtained in the same manner as in Example 1 except that the retarder film and the acrylic adhesive layer were omitted in Comparative Example.

Evaluation Test

The (optically compensatory) polarizing plates obtained in each of Examples 1 and 2 and Comparative Example were bonded to opposite surfaces of a TN liquid-crystal cell with the polarizing plates outward to thereby obtain a liquid-crystal display device. As a result, in each of Examples 1 and 2, it was possible to obtain a liquid-crystal display device which was short in lowering of contrast and the change of chromaticity due to the view field angle. On the contrary, in Comparative Example, a phenomenon that white display was colored to yellow in accordance with the viewing angle occurred so that contrast was lowered remarkably at a view field angle of 60 degrees or higher.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A composite retarder plate comprising:
   at least one retarder film; and
   at least one liquid-crystal phase sheet disposed on said retarder film, said liquid-crystal phase sheet comprising a transparent substrate and a liquid-crystal polymer layer provided on said transparent substrate,
   wherein at least one of refractive indices nx, ny and nz of said retarder film is different from the other refractive indices when nx and ny (nx≧ny) are main refractive indices in in-plane directions and nz is a refractive index in a thickness direction of said retarder plate,
   wherein all refractive indices nx, ny and nz of said transparent substrate are different from one another,
   wherein said retarder film, said transparent substrate and said liquid-crystal polymer layer are different in wavelength dependence of birefringence,
   wherein said retarder film and said transparent substrate are different in Nz defined by an expression (nx−nz)/(nx−ny), and
   wherein each of said retarder film and said transparent substrate is constituted by a film having non-liquid-crystal high molecules oriented.

2. A composite retarder plate according to claim 1, wherein said liquid-crystal phase sheet has orientation exhibiting asymmetry with respect to a plane including a line normal to said liquid crystal phase sheet, said asymmetry being characteristic of birefringence.

3. A composite retarder plate according to claim 1, wherein an absolute value of a photoelastic coefficient of the high-molecular film constituting said retarder film is not larger than $50 \times 10^{-12}$ $m^2/N$.

4. A composite retarder plate according to claim 1, wherein an absolute value of a photoelastic coefficient of the high-molecular film constituting said transparent substrate is not larger than $20 \times 10^{-12}$ $m^2/N$.

5. An optically compensatory polarizing plate, wherein a composite retarder plate according to any one of claims 1 to 4 is provided on a single side of an absorption type polarizing plate.

6. A liquid-crystal display device, wherein an optically compensatory polarizing plate according to claim 5 is provided on at least one side of a liquid-crystal cell.

* * * * *